Dec. 19, 1950 E. E. ERIKSSON 2,534,586
WHEEL ASSEMBLY
Filed Nov. 29, 1945
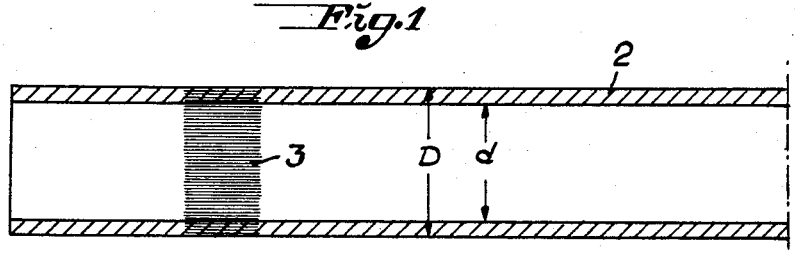
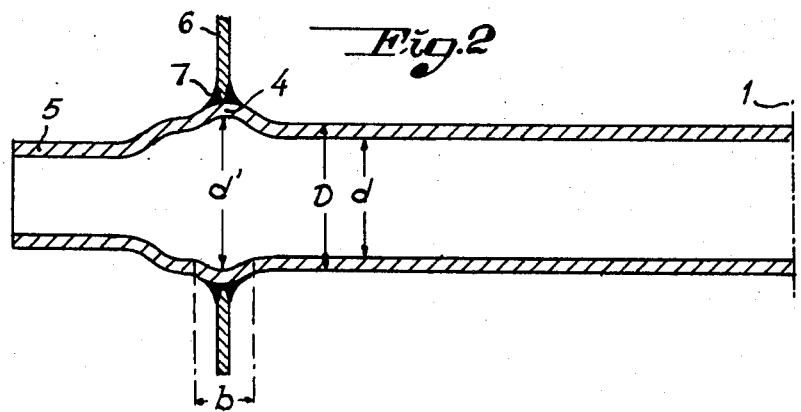
Inventor:
Edward Emanuel Eriksson,
by Pierce & Scheffler
Attorneys.

UNITED STATES PATENT OFFICE 2,534,586

WHEEL ASSEMBLY

Edvard Emanuel Eriksson, Degerfors, Sweden, assignor to Degerfors Jarnverks Aktiebolag, Degerfors, Sweden, a corporation of Sweden Application November 29, 1945, Serial No. 631,631
In Sweden December 23, 1944

1 Claim. (Cl. 295—43)

The present invention relates to a wheel assembly for railway cars and similar vehicles, said wheel assembly comprising a hollow wheel axle which extends through central openings in the wheel discs and is connected thereto by means of weld joints. Due to the pressure from the wheel tire transmitted through each wheel disc, great stresses of material occur at the place of connection between the hollow axle and each wheel disc. If the wheel tire is shrunk on the wheel disc, said stresses may even amount to the limit of stretching strain and cause plastic deformation at said place. Consequently, it is highly important that the hollow axle be devised in such a manner that the stresses occurring particularly in the inner surface at the place of connection with the wheel disc will become as small as possible and in any case be maintained below the limit of stretching strain of the material.

The invention has for its object so to shape the hollow axle in the ranges adjoining the radially outwardly extending wheel discs that the risk of deformation or fracture due to fatigue is eliminated to such an extent that adequate safety is obtained without the necessity of providing the axle with special reinforcements at the places in question. The invention also has for its object to provide a simple method of manufacturing wheel axles devised in accordance with the invention.

The invention is described more in detail with reference to the annexed drawing in which Fig. 1 is a longitudinal section of one half of a tubular member for manufacturing the axle, while Fig. 2 illustrates one half finished axle with an appertaining portion of a wheel disc welded thereto. Since the wheel assembly is assumed to be symmetric with respect to the plane I (Fig. 2) through the central section of the axle, the manufacturing method will be described in the following with reference merely to the half shown in the drawing.

The tubular member 2 illustrated in Fig. 1 has an outer diameter $D$ and an inner diameter $d$, said diameters corresponding to the desired dimensions of the finished axle. The length of the tubular member is somewhat greater than the total length of the axle, that is the distance between the ends of the journals. The length of the tubular member is so much greater than the length of the finished axle that a sufficient quantity of material is available for the formation of the bulges. The tubular member 2 which may be manufactured in any suitable manner, such as by rolling or welding, should be completely smooth even on the inner face so as to eliminate fracture indications. Alternatively, the axle may be subject to smooth turning after the formation of the arch-like bulges.

After partial heating of the tubular member 2 around the annular portion indicated at 3 where the wheel disc is to be connected with the axle, the tubular member is compressed or upset in longitudinal direction by application of pressure in a suitable upsetting machine, with the result that the heated portion 3 will be forced outwardly so as to form an annular bulge 4 which is arch-shaped as viewed in the longitudinal central section of the axle (Fig. 2). Experience has proved that, generally, it is not necessary to insert a mandrel or the like member into the tube, since the material during its compression tends to flow in an outward direction. Thereupon, the diameter of the end of the tube is reduced, if such reduction has not been carried out before, for instance by a forging or pressing treatment, so as to form a journal 5, whereupon the wheel disc 6 is welded to the bulge 4 by means of an annular weld 7 in a manner such that the wheel disc smoothly merges into the adjoining portions of the axle.

Even if the thickness of the axle should be slightly reduced at the apex of the bulge, the construction shown yet results in an increase of the moment of resistance at the bulge on account of the increased diameter of the arch-shaped projection. The width $b$ of the bulge should be at least as great as the range of the axle within which the radial pressure can give rise to deformation. Thus, the width $b$ should be at least $0.5 \sqrt{D^2-d^2}$. The inner diameter $d'$ at the central portion of the bulge depends upon the value of the occurring stresses. Generally, said diameter $d'$ need not considerably be greater than the outer diameter $D$ of the axle.

As a result of the bulge 4, the weld joint 7 is located radially outwardly of the periphery of the axle. Consequently, the weld joint is accessible to inspection by means of X-rays, and an even and unobstructed course of stresses is secured at the place of connection between the axle and the wheel discs. If desired, the tubular member may be provided with annular reinforcements before it is subject to the upsetting treatment.

Obviously, the invention is not limited to the described method for providing the bulges nor to any number of such bulges.

What I claim is:

A wheel and axle assembly for railway rail vehicles comprising a tubular wheel axle of substantially constant wall thickness from end to end thereof, a journal formed at the end of said axle, the wall of said axle having a radial enlargement providing an annular bulge adjacent the inner end of the journal, said annular bulge being arch-shaped in axial section with the outer surface convex and inner surface concave and substantially parallel thereto, a wheel disc having a central opening, the annular bulge on said axle seating in the opening in the wheel disk and welded thereto.

EDVARD EMANUEL ERIKSSON.

REFERENCES CITED

The following references are of record in the file of this patent:

UNITED STATES PATENTS

| Number | Name | Date |
|---|---|---|
| 1,703,714 | Booth | Feb. 26, 1929 |
| 1,745,153 | Dalton | Jan. 28, 1930 |
| 1,902,910 | Oelkers | Mar. 28, 1933 |
| 1,982,400 | Riemenschneider | Nov. 27, 1934 |

FOREIGN PATENTS

| Number | Country | Date |
|---|---|---|
| 658,358 | Germany | Mar. 30, 1933 |
| 603,374 | Germany | Sept. 13, 1934 |

The present invention relates to a wheel assembly for railway cars and similar vehicles, said wheel assembly comprising a hollow wheel axle which extends through central openings in the wheel discs and is connected thereto by means of weld joints. Due to the pressure from the wheel tire transmitted through each wheel disc, great stresses of unvaried type occur at the place of connection between the hollow axle and each wheel disc. If the wheel tire is shrunk on the wheel disc, said stresses may even amount to the limit of stretching strain and cause plastic deformation at said place. Consequently, it is highly important that the hollow axle be devised in such a manner that the stresses occurring particularly in the inner surface at the place of connection with the wheel disc will become as small as possible and in any case be maintained below the limit of stretching strain of the material.

The invention has for its object so to shape the hollow axle in the ranges adjoining the radially outwardly extending wheel discs that the risk of deformation or fracture due to fatigue is eliminated to such an extent that adequate safety is obtained without the necessity of providing the axle with special reinforcements at the places in question. The invention also has for its object to provide a simple method of manufacturing wheel axles devised in accordance with the invention.

The invention is described more in detail with reference to the annexed drawing, in which Fig. 1 is a longitudinal section of one half of a tubular member for manufacturing the axle, while Fig. 2 illustrates one half finished axle with a wheel disc welded thereto. Since the wheel assembly is assumed to be symmetrical with respect to the plane (Fig. 2) through the central section of the axle, the manufacturing method will be described in the following with reference merely to the half shown in the drawing.

The tubular member 1 illustrated in Fig. 1 has an outer diameter D and an inner diameter d, said diameters corresponding to the desired dimensions of the finished axle. The length of the tubular member is somewhat greater than the total length of the axle, that is the distance between the ends of the journals. The length of the tubular member is so much greater than the length of the finished axle that a sufficient quantity of material is available for the formation of the bulges. The tubular member 1 which may be manufactured in any suitable manner, such as by rolling or welding, should be completely smooth even on the inner face so as to eliminate fracture indications. Alternatively, the axle may be subject to smooth turning after the formation of the arch-like bulges.

After partial heating of the tubular member 1 around the annular portion indicated at 6 where the wheel disc is to be connected with the axle, the tubular member is compressed or upset in longitudinal direction by application of pressure in a suitable upsetting machine, with the result that the heated portion 3 will be forced outwardly so as to form an annular bulge 4 which is arch-shaped as viewed in the longitudinal central section of the axle (Fig. 2). Experience has proved that, generally, it is not necessary to insert a mandrel or the like member into the tube, since the material during its compression tends to flow in an outward direction. Thereupon, the diameter of the end of the tube is reduced, if such reduction has not been carried out before, for instance by a forging or pressing treatment, so as to form a journal 5, whereupon the wheel disc 2 is welded to the bulge 4 by means of an annular weld 7 in a manner such that the wheel disc smoothly merges into the adjoining portions of the axle.

Even if the thickness of the axle should be slightly reduced at the apex of the bulge, the experiments show that it results in an increase on account of the increased diameter of the arch-shaped projection. The width B of the bulge should be at least as great as the range of the axle within which the radial pressure can give rise to deformation. Thus, the width B should be at least 1.5 D. The inner diameter d' at the central portion of the bulge depends upon the value of compressive stresses. Generally, said diameter d' need not be considerably greater than the outer diameter D of the axle.

As a result of the bulge 4, the weld joint 7 is located radially outwardly of the periphery of the axle. Consequently, the weld joint is accessible to inspection by means of X-rays, and even said non-laminated zones of stresses as occur at the place of connection between the axle and the wheel face. If desired, the tubular member may be provided with annular reinforcements before it is subject to the upsetting treatment.

Obviously, the invention is not limited to the described method for providing the bulges nor to any number of such bulges.